Nov. 30, 1926.
G. G. DAVIS ET AL
1,608,876
PULP BARK REMOVING SYSTEM
Original Filed July 8, 1924   2 Sheets-Sheet 2
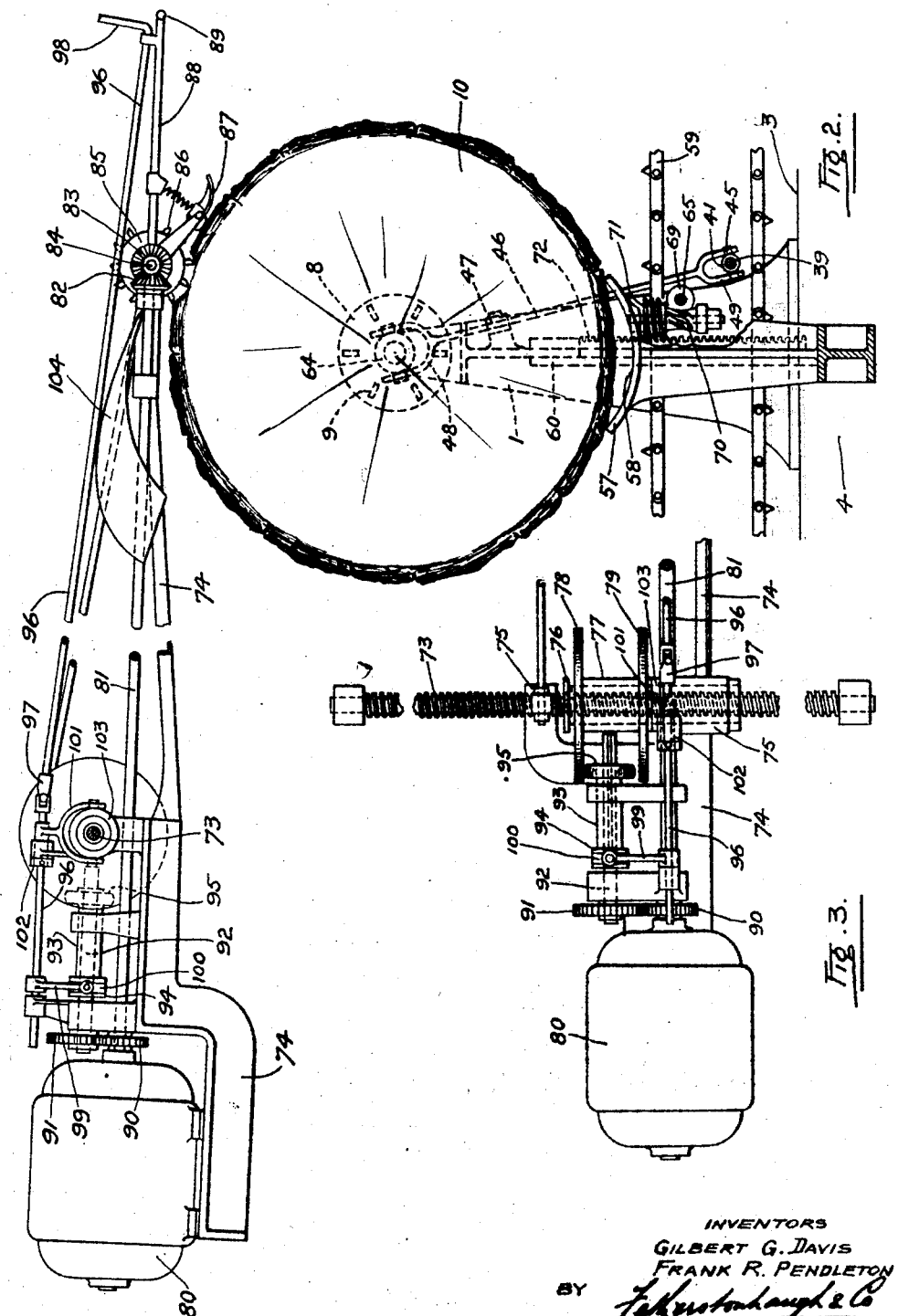
INVENTORS
GILBERT G. DAVIS
FRANK R. PENDLETON
BY
ATTORNEYS Patented Nov. 30, 1926.

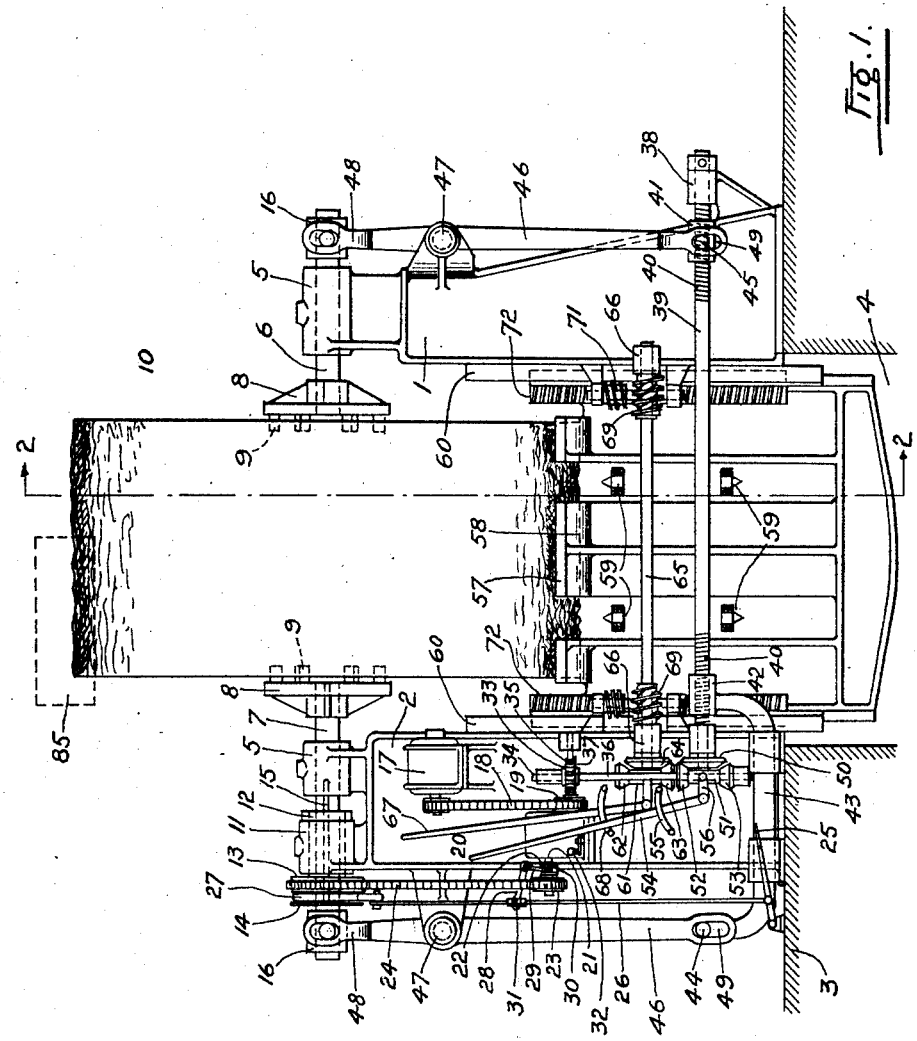

1,608,876

UNITED STATES PATENT OFFICE.

GILBERT G. DAVIS AND FRANK R. PENDLETON, OF VANCOUVER, BRITISH COLUMBIA, CANADA.

PULP-BARK-REMOVING SYSTEM.

Application filed July 8, 1924, Serial No. 724,889. Renewed October 20, 1926.

Our invention relates to improvements in pulp bark removing systems, the objects of which are to remove the bark from pulp logs before the logs are split or sawn lengthwise of the grain, a further object is to provide means whereby the bark removing tool is readily controlled to prevent its cutting beyond the bark and into the wood of the logs, a still further object is to provide a device which can be driven by any desired prime mover and in such sizes that it may be freely moved from place to place or mounted upon a vessel in which pulp logs may be loaded for transit to the pulp mill.
The invention consists of a system whereby the logs are sawn to length and are rotated between opposing horizontal shafts while a rotary cutter is moved lengthwise thereof to rip off the bark, as will be more fully described in the following specification, in which:—

Fig. 1 is a front view of the log rotating device.

Fig. 2 is a sectional view taken on the line 2—2 of Fig. 1 also showing a side view of the bark removing device.

Fig. 3 is a fractional plan view of the bark removing device.

The numerals 1 and 2 indicate a pair of standards mounted upon the floor 3 and separated by a pit 4, on the top of the standards, bearings 5 are formed for the purpose of journalling a pair of head shafts 6 and 7. Upon the inner ends of the head shafts 6 and 7 are face plates 8 having a plurality of radial teeth 9 which are adapted to engage the ends of the log 10 to rotate it between the shafts 6 and 7. The numeral 11 indicates an end bearing upon the standard 2 in which a longitudinally grooved sleeve 12 is rotatable and which is provided at its outer end with a chain sprocket 13 and a brake drum 14. The shaft 7 is provided with an elongated feather key 15 which engages the groove of the sleeve 12 so that the rotation of the sprocket 13 imparts a similar rotation to the shaft. A trunnioned thrust collar 16 is mounted upon the outer ends of the shafts through which they are moved endwise to engage or disengage the log. Suitably mounted upon the standard 2 is a motor 17 by which the various movements of the machine are actuated through a chain 18 and a chain sprocket 19.

The numeral 20 indicates a multiple speed gear of any suitable type having a driven shaft 21 to which a sliding clutch 22 is secured, which clutch is adapted to engage a chain sprocket 23 which is connected by a chain 24 to impart rotation to sprocket 13 and the shaft 7. The numeral 25 indicates a foot pedal for actuating a vertical rod 26 connected at its upper end to a brake band 27 surrounding the brake drum 14. Suitably fulcrumed adjacent the speed gear 20 is a bell crank 28 having a forked member 29 engaging a collar 30 upon the clutch 22 and an eyed member 31 having pivotal engagement with the rod 26 so that as the clutch is thrown out to disconnect the drive from the speed gear 20 to the shaft 7 the brake is applied to arrest its rotation. The numeral 32 indicates a lever by which the desired speed change in the speed gear 20 is effected.

The numeral 33 indicates a worm continuously driven by the sprocket 19 to the front of which is a vertical shaft 34 having a work gear 35 in mesh with the worm, a similar shaft 36 having a worm gear 37 to mesh with the worm 33 is mounted directly behind the shaft 34, the purpose whereof will hereinafter appear. Extending between the standards 1 and 2 and rotatably mounted in outstanding bearing brackets 38 is a shaft 39 having right and left hand threads 40 adjacent opposite ends, which are fitted with threaded sleeves 41 and 42, the sleeve 42 is connected to a slidably mounted cranked bar 43 having a pivot pin 44 at its outer end, the sleeve 41 is similarly provided with a pivot pin 45. A pair of levers 46 are fulcrumed upon the standards 1 and 2 as at 47 and are forked at their upper ends as at 48 to engage the trunnioned thrust collars 16 of the shafts 6 and 7, the lower ends of the levers being eyed as at 49 to engage respectively the pivot pin 44 and 45 so that as the shaft 39 is rotated the sleeves 41 and 42 move endwise in one direction thereof and through the levers 45 impart an opposite endwise movement to the shafts 6 and 7 and the face plates 8 to grip or release the log 10. Keyed upon the end of the shaft 39 is a friction cone 50, and endwise movable upon the vertical shaft 34 is a sleeve 51 which is adapted to rotate therewith and which is provided at opposite ends with a pair of friction cones 52 and 53.

The numeral 54 indicates a lever movable within a quadrant 55 and having a forked crank 56 at its lower end connected to the sleeve 51 so that as the lever 54 is moved to the right the cone 52 engages the cone 50 to impart rotation to the shaft 39 in one direction and similarly when the lever is moved to the left the cone 53 engages the cone 50 thus imparting rotation to the shaft in the opposite direction, when the lever is set midway along the quadrant 55 the cones 52 and 53 are free to rotate without engaging the cone 50 of the shaft 39. The numeral 57 indicates a table having a concave top 58 which is adapted to receive the log 10 from the conveyor chains 59, the table is vertically movable upon a pair of guides 60 mounted upon the standards 1 and 2. Keyed upon the lower end of the shaft 35 and having endwise movement thereon is a sleeve 61 having a friction cone 62 at one end and a similar cone 63 at the opposite end, driven with either of these cones is a cone 64 mounted upon a horizontal shaft 65 which is journalled in bearings 66. The numeral 67 indicates a bell cranked lever similar in all respects to the lever 54 which is movable within a quadrant 68 so that when the lever is set centrally of its quadrant both of the cones 62 and 63 are out of engagement with the cone 64 and in consequence no rotation is imparted to the shaft 65, but when the lever is set to the left the cone 63 is brought into engagement with the cone 64 to rotate it in one direction and when set to the right the cone 62 is brought into engagement with the cone 64 to rotate it in the opposite direction. A pair of worm pinions 69 are keyed upon the shaft 65 each of which engage a worm wheel 70 (see Fig. 2) which are vertically disposed and keyed to worm pinion 71 which in turn mesh with a pair of vertical racks 72 to raise or lower the log table 57.

The numeral 73 (see Figs. 2 and 3) indicates a non-rotating heavy threaded shaft suitably supported at opposite ends and upon which the bark removing device is suspended and has endwise movement. 74 is frame member suspended from the shaft 73 by a pair of bearings 75 between which an internally threaded sleeve 76 is mounted, upon the sleeve 76 a further sleeve 77 is secured in such a manner as to provide for a slight endwise movement therealong and at each end of this sleeve friction discs 78 and 79 are mounted. The numeral 80 indicates a motor mounted upon the frame 74, the shaft 81 of which is carried through to the forward end of the frame and is provided with a bevel pinion 82 which engages a further pinion 83 keyed to a transverse shaft 84 suitably journalled upon the frame. A cutter head 85, indicated in dotted lines in Figure 1 and in full lines in Figure 2, is mounted upon the shaft 84 and is provided with blades 86 for cutting through the bark of the log 10.

The numeral 87 indicates a spring shoe mounted adjacent the forward end of the frame which rides upon the bark of the log to prevent the cutter from being inadvertently depressed too deeply into the log, but which is so tensioned that in the event of irregularities in the contour of the log being encountered the shoe will give to enable the cutter head 85 being depressed into operative contact therewith. An extension 88 to the forward end of the frame is provided for the purpose of carrying a transverse handle 89 by which the cutter head 85 is brought into contact with the log. On the shaft 81 adjacent the motor we fit a gear wheel 90 which meshes with a gear wheel 91 secured to a splined counter shaft 92.

The numeral 93 indicates a sleeve endwise movable along and rotatable with the shaft 92 which is provided with a grooved collar 94 at one end and friction wheel 95 at the opposite end. An operating rod 96 is mounted above the shaft 81 and is provided with a universal joint 97 to permit of its outer end being brought to a convenient position adjacent the handle 89 and is turned up at a right angle to itself to form a control lever 98. Upon the rear end of the rod 96 a yoke 99 is connected to a trunnioned split collar 100, engaging the grooved collar 94 of the sleeve 93 so that as the control lever 98 is drawn towards the operator the friction wheel 95 is moved closer to the axis of the friction discs 78 and 79 to increase the speed of their rotation thereby and that of the threaded sleeve 76 upon the screw shaft 73.

The numeral 101 indicates a yoke mounted upon a sleeve 102 suitably journalled upon the frame through which the rod 96 has a slight endwise movement and to which it is keyed against rotation, the yoke being connected to a trunnioned split collar 103 engaging the end of the sleeve 77 so that as the rod 96 is rocked by the control lever 98 to the left an endwise movement is imparted to the sleeve 77 to bring the disc 79 into engagement with the friction wheel 95 to be driven thereby and through the rotation of the threaded sleeve 76 to move the bark removing device lengthwise of the screw shaft 73.

The numeral 104 indicates a splayed deflector mounted upon the frame 74 against the underside of which the chippings of bark and the like are thrown by the cutter head 85 and are deflected downwards to the rear of the log 10.

Having thus described the several parts of our invention we will now briefly explain its operation.

The logs are placed upon the conveyor chains 59 and are brought thereon to the table 57 when by a movement of the lever 67 the table rises, lifting the log off the chains to a position for centering between the face plates 8, when in this position the lever 67 is put into neutral position and the lever 54 swung over to bring the face plates together to engage the ends of the log, the table is then lowered to clear the log. The speed gear having been set by means of lever 32 to rotate the log at a required speed which will vary according to the diameter of the log, the pedal 25 is raised removing the brake 27 from the drum 14 and engaging the clutch 22 with the sprocket 23 so that the log is slowly rotated by the motor 17. The handle 89 of the bark removing device is drawn down until the cutter 85 is about to engage the bark of the log, the lever 98 is moved endwise and set over as desired to provide for a desired speed of endwise travel of the device and the cutter then is brought into actual engagement with the bark to remove it. When the cutter has moved endwise throughout the length of the log and the bark has been removed, the lever 98 is pulled forward and swung to the left to return the bark removing device to starting point, when the lever is set in vertical position arresting its travel and on the handle 89 being released the device assumes a horizontal position with the cutter removed from the surface of the log. The lever controlling the face plates is then moved to a reverse position to release the log and again deposit it upon the table. The lowering of the table by reversing the lever deposits the log on the conveyor chains so that as the conveyor is next moved the bark stripped log passes out from the machine and a new one is brought into position over the table 57.

What we claim as our invention is:

1. Bark removing means comprising a cutter carrying frame, a threaded shaft passing through and pivotally supporting said frame, a sleeve threaded on said shaft, a motor mounted on said frame and a drive connection between the motor and the sleeve adapted to rotate the latter to shift the frame longitudinally of the shaft.

2. Bark removing means comprising a cutter carrying frame, a shaft supporting said frame a motor mounted on the frame, and means for moving the frame longitudinally of said shaft comprising a sleeve threaded on the shaft and a reversible drive connection between the sleeve and the motor.

3. Bark removing means comprising a cutter carrying frame, a threaded shaft passing through and supporting said frame, a motor mounted on the frame, and means for causing the frame to travel longitudinally of said shaft comprising a sleeve threaded on the shaft, spaced friction discs fixed to said sleeve, a drive disc arranged between and at right angles to said friction discs, a drive connection between the motor and the drive disc, and means for engaging the drive disc with either of said friction discs whereby said frame may be caused to travel in either direction along the said shaft.

4. Bark removing means comprising a cutter carrying frame, a threaded shaft passing through and supporting said frame, a motor mounted on the frame, a sleeve threaded on said shaft, a second sleeve having a limited sliding movement on the first named sleeve, a pair of friction discs fixed to said second sleeve, a drive disc positioned between said friction discs, a drive connection between the motor and the drive disc and means for shifting said second sleeve a limited distance longitudinally in either direction so as to engage said drive disc with either of said friction discs.

5. Bark removing means comprising a cutter carrying frame, a motor mounted thereon, and means for supporting and shifting said frame in a latteral direction comprising a threaded shaft and a sleeve threaded thereon, one of the two last named elements being stationary and the other rotatable with respect thereto and a drive connection between the motor and the rotatable element.

6. Bark removing means comprising a cutter carrying frame, a support for the frame, a motor mounted on the frame, a pair of spaced rotatable friction discs mounted to move laterally with the frame, a drive disc driven by the motor and adapted to be selectively engaged with either of said friction discs, and means actuated by said friction discs for shifting the frame longitudinally of its support, said means serving to shift the frame in one direction when the drive disc is engaged with one of said friction discs and in the reverse direction when the drive disc is engaged with the remaining friction disc.

7. Bark removing means comprising a cutter carrying frame, a non-rotating threaded shaft passing through and supporting said frame, a sleeve threaded on the shaft and arranged to carry the frame therewith when traveling longitudinally of the shaft and means for imparting rotary movement to said sleeve.

8. Bark removing means comprising a cutter carrying frame, a non-rotating threaded shaft passing through and supporting said frame, a sleeve threaded on said shaft adapted to carry the frame therewith when moving longitudinally of said shaft, and reversible means for rotating said sleeve to shift the frame longitudinally in either direction.

9. Bark removing means comprising a cutter carrying frame, a non-rotating threaded shaft passing through and supporting said frame, a sleeve threaded on said shaft, a pair of spaced friction discs fixed to rotate with said sleeve, a drive disc interposed between said friction discs, means for selectively engaging the drive disc with either friction disc and means for imparting rotary movement to the drive disc.

10. Bark removing means comprising a frame, a supporting shaft passing transversely therethrough, a motor mounted on the frame, a cutter rotatably mounted on the frame and connected with the motor shaft to be driven thereby, and means actuated from the motor shaft for shifting the frame laterally along the length of the supporting shaft.

11. Bark removing means comprising a frame, a non-rotating threaded shaft passing through and supporting said frame, a motor mounted on the frame, a rotatable cutter carried by the frame and connected to the motor shaft to be driven thereby, a sleeve threaded on said supporting shaft, adapted to travel longitudinally of said shaft when rotated and to carry the cutter frame therewith, and means actuated by the motor shaft for rotating said sleeve.

12. A structure according to claim 11 in which the last named means is reversible to rotate the sleeve in either direction.

13. Bark removing means comprising a frame, a non-rotating threaded shaft passing through and supporting said frame, a motor mounted on the frame, a rotatable cutter mounted on the frame and connected to the motor shaft to be rotated thereby, an internally threaded sleeve mounted upon the threaded supporting shaft arranged to travel longitudinally thereof when rotated and to carry the cutter frame therewith, a countershaft supported by the frame and driven from the motor shaft, and a reversible drive connection between the countershaft and the said sleeve adapted to impart rotary movement to the latter.

Dated at Vancouver, B. C., this 17th day of June 1924.

GILBERT G. DAVIS.
FRANK R. PENDLETON.